United States Patent
Sizemore

(10) Patent No.: US 7,278,763 B2
(45) Date of Patent: Oct. 9, 2007

(54) ANTITHEFT DEVICE AND METHOD FOR VEHICLE LAMP

(75) Inventor: Jay A. Sizemore, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 47 days.

(21) Appl. No.: 11/276,430

(22) Filed: Feb. 28, 2006

(65) Prior Publication Data

US 2007/0201237 A1    Aug. 30, 2007

(51) Int. Cl.
*F21V 15/00* (2006.01)
(52) U.S. Cl. .................. 362/376; 362/459; 362/507; 362/549
(58) Field of Classification Search ........ 362/376–378, 362/459, 507, 549
See application file for complete search history.

(56) References Cited

U.S. PATENT DOCUMENTS

| | | | |
|---|---|---|---|
| 1,882,745 A | 10/1932 | Beltz | |
| 2,658,135 A | 11/1953 | Woolfolk | |
| 3,518,613 A | 6/1970 | Alpert | |
| 4,055,277 A | 10/1977 | Fegley et al. | |
| 4,684,192 A | 8/1987 | Long et al. | |
| 4,791,535 A * | 12/1988 | Sclafani et al. | 362/549 |
| 5,069,631 A | 12/1991 | Bauer et al. | |
| 5,080,600 A | 1/1992 | Baker et al. | |
| 6,004,002 A * | 12/1999 | Giannone | 362/376 |
| 6,244,736 B1 * | 6/2001 | O'Neal | 362/549 |
| 6,392,541 B1 | 5/2002 | Bucher et al. | |
| 6,536,920 B2 | 3/2003 | Imachi et al. | |
| 2002/0155738 A1 | 10/2002 | Ohsawa et al. | |

FOREIGN PATENT DOCUMENTS

| | | |
|---|---|---|
| DE | 19600638 | 7/1996 |
| FR | 2552504 | 3/1985 |
| FR | 2591967 | 6/1987 |
| FR | 2749642 | 12/1997 |
| WO | WO03/041229 | 5/2003 |

* cited by examiner

*Primary Examiner*—Stephen F. Husar
(74) *Attorney, Agent, or Firm*—Mark E. Duell; Cermak Kenealy & Vaidya LLP

(57) ABSTRACT

A method and system for deterring theft of a vehicle lamp component can include a flexible member that can be permanently or semi-permanently attached to a vehicle lamp such that valuable portions of the vehicle lamp are destroyed if/when unauthorized detachment of the lamp occurs. The vehicle lamp can include a light source, electronic circuitry such as a ballast, and electrical wiring interconnecting the light source and the ballast. The antitheft method and system can include connecting a cable at one end to a vehicle structural member, and forming a loop in the cable to encircle the electrical wiring interconnecting the light source and the ballast without allowing passage of at least one of the light source or the ballast through the loop in the cable.

20 Claims, 5 Drawing Sheets

ANTITHEFT DEVICE AND METHOD FOR VEHICLE LAMP

BACKGROUND

1. Field

An antitheft system for a vehicle lamp can deter theft of the vehicle lamp and/or components of the lamp by destroying at least a portion of the lamp upon unauthorized removal of the lamp from the vehicle.

SUMMARY

According to one aspect of the disclosed subject matter, a system can be provided for deterring the theft of lamp and/or components thereof, such as high intensity discharge lamps/components, LED lamps/components, or other vehicle lamps/components. The vehicle lamp can include at least one light source (e.g., light bulb, semiconductor light source, etc.), a separate lamp device (e.g., a ballast, power transformer, power regulator, computer, programmable controller, etc), and electrical wiring that interconnects the at least one light source and the at least one separate lamp device. The antitheft system can include a flexible member, such as a cable, that has a first portion configured to connect to a portion of a vehicle, such as a vehicle frame member. Another "loop" portion of the cable can be formed as a loop that encircles the electrical wiring that interconnects the at least one light source and the separate lamp device. The loop portion can be configured or be configurable to not allow passage of at least one of the light source or the separate lamp device through the loop.

The loop in the flexible member can be formed by adjustably connecting a first portion of the flexible member to a second portion of the flexible member using a fastener. The fastener can be adapted to fix the first portion of the flexible member to the second portion after the loop is formed around the electrical wiring. Alternatively, the loop can be formed about or through the electrical wiring and each of the opposite ends of the flexible member can be separately attached to one or more portions of the vehicle.

The flexible member can be made from a material including, but not limited to, one or more of hardened metal cable, braided metal material, high strength plastic material, chain, composite material, Kevlar, other high strength woven material, etc. The electrical wiring interconnecting the at least one light source and the separate lamp device has a first breaking strength, and the flexible member has a second breaking strength that is greater than the first breaking strength, thereby ensuring that the wiring would have to be broken to remove the at least one light source and/or lamp device from the vehicle.

The vehicle lamp can be supported by a housing mounted to a vehicle frame member, and the separate lamp device can be bolted to the lamp housing by a plurality of connection structures, such as bolts, clamps, screws, and other connection devices and/or adhesives. The electrical wiring interconnecting the separate lamp device and the at least one light source can be encircled by the loop in the flexible member, and the loop in the flexible member can be positioned to extend between the wiring and the connection structure(s) fastening the separate lamp device to the lamp housing.

BRIEF DESCRIPTION OF THE DRAWINGS

The invention of the present application will now be described in more detail with reference to exemplary embodiments of the apparatus and method, given only by way of example, and with reference to the accompanying drawings, in which.

DETAILED DESCRIPTION OF EXEMPLARY EMBODIMENTS

Figure 1:
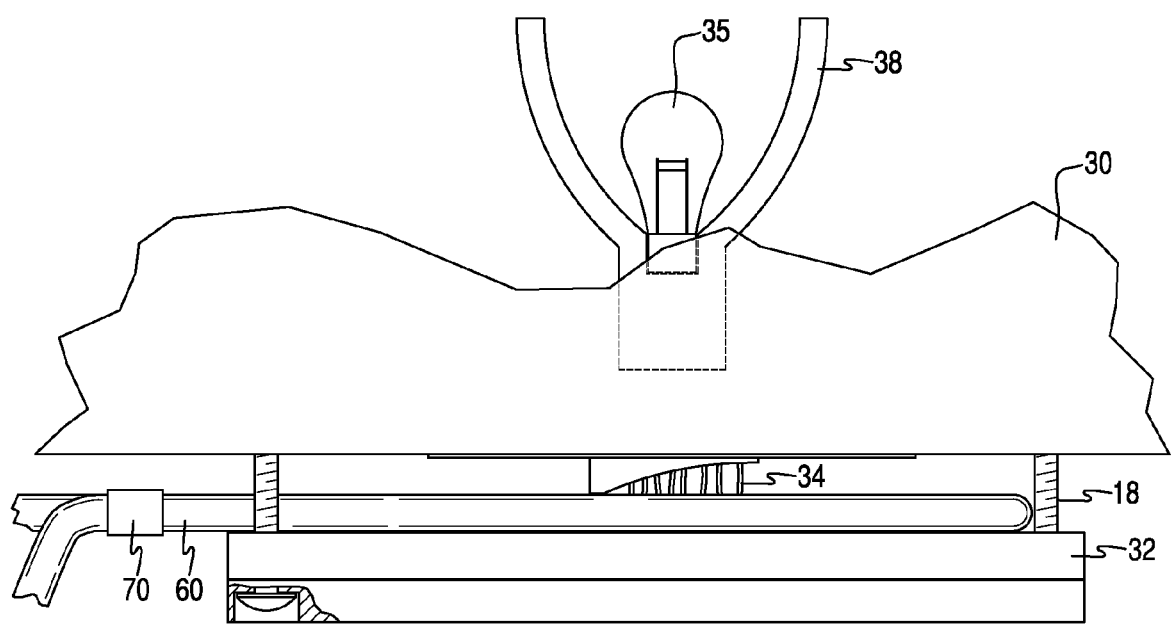
FIG. 1 is an elevation view of an embodiment of an installed antitheft device.
Figure 3:
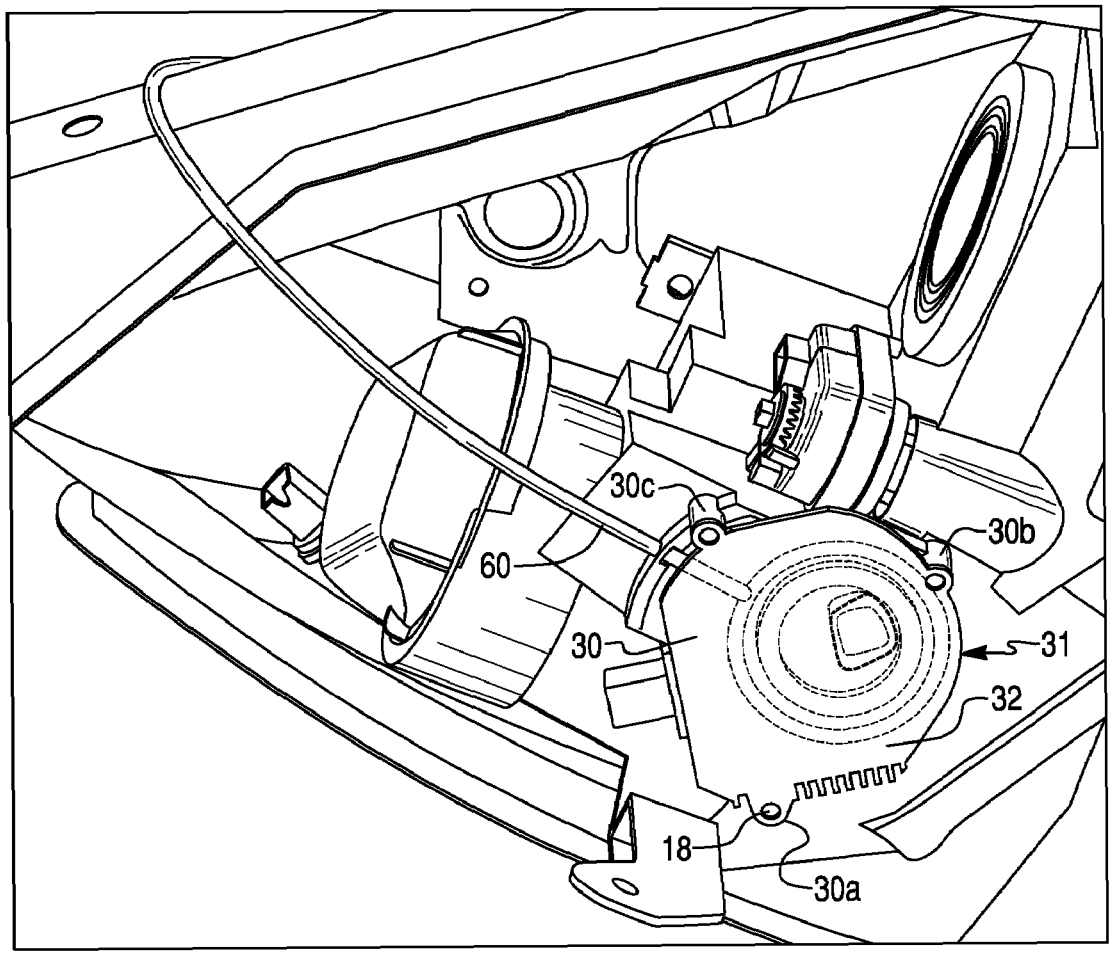
FIG. 3 is a bottom view of a connection between an embodiment of an installed antitheft device and an HID headlight ballast.
Figure 4:
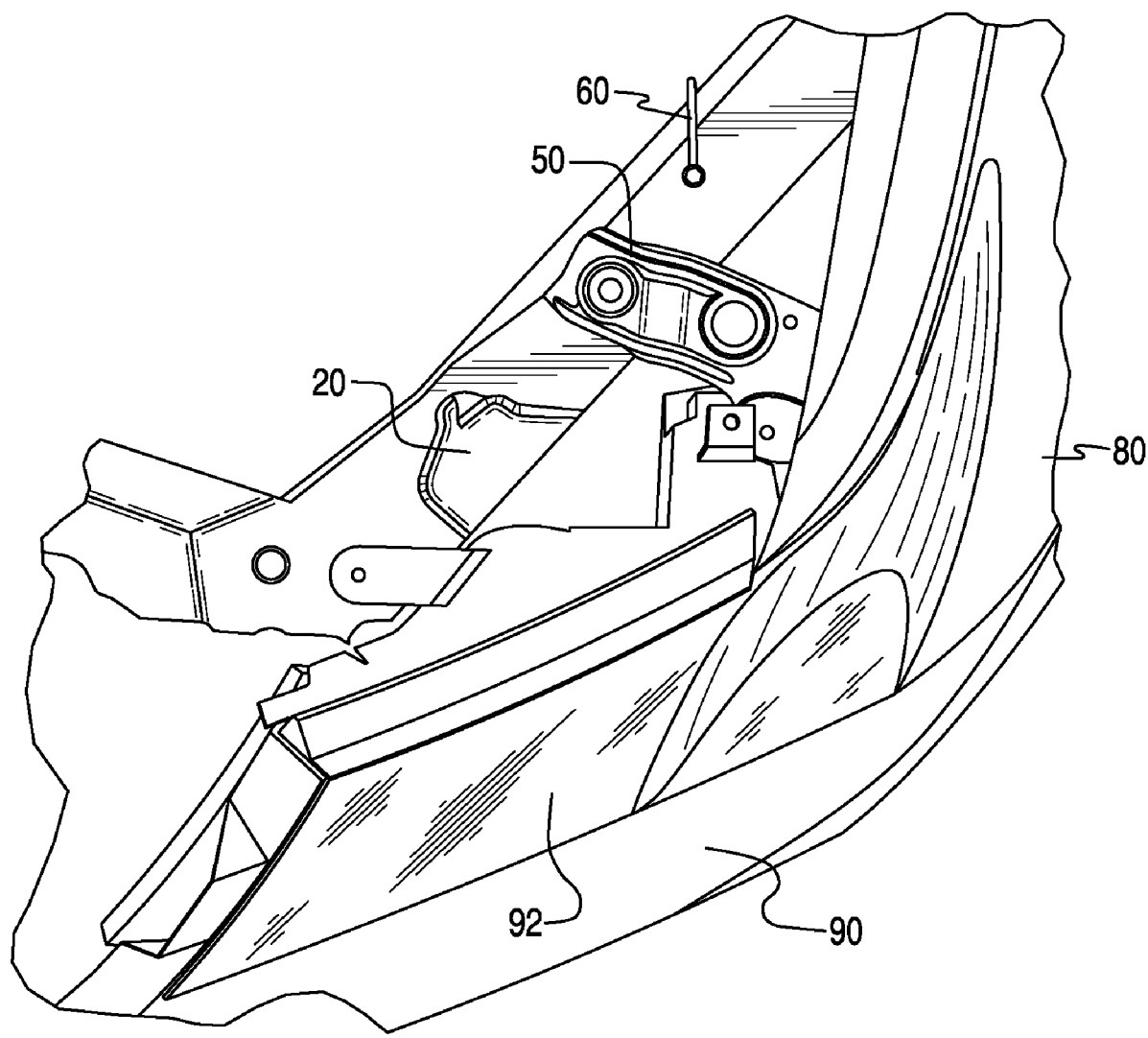
FIG. 4 is a top view of structural elements of a vehicle used in the mounting of the headlight and antitheft device according to an embodiment.

Referring initially to FIGS. 1 and 3, an antitheft device for deterring the theft of a vehicle lamp and/or its components is shown. In this embodiment, the light source of the vehicle lamp is shown as a high intensity discharge (HID) lamp 35 that includes a power transformer/regulator in the form of a ballast 32. The vehicle lamp can include a vehicle headlight assembly 31 with headlight housing 30 and one or more light sources or lamps, such as the metal halide lamps described in U.S. Pat. Nos. 6,586,891 and 6,975,077, which are herein incorporated in their entireties by reference. A reflector 38 can be provided in the housing 30 to direct light forward from the HID light source 35. The electronic circuitry of the vehicle lamp can include a ballast 32, which can be separated from the bulb or lamp and interconnected to the bulb or lamp via electrical wiring 34. The lamp can be mounted behind a headlight lens cover 92, such as shown in FIG. 4, and in conjunction with a front fender 80 of the vehicle at the front extent of a hood. A vehicle structural member or bulkhead 20 can provide support for the headlight assembly 31 through additional structural members such as fender bracket 50, as shown in FIG. 4, and in cooperation with the front fender 80 and front vehicle bumper 90.

The vehicle lamp housing 30 can comprise materials including, but not limited to, plastic materials, metal, and/or other composite materials, and can include a plurality of bosses or other mounting portions, such as bosses 30a, 30b, and 30c shown in FIG. 3. The bosses can provide a mounting platform for electronic circuitry operatively associated with the bulbs or lamps. The electronic circuitry can comprise a ballast 32 adapted to restrict current flow to less than a predetermined amount during operation and/or provide means for applying a high-voltage pulse voltage, or other functions performed in the operation of a high intensity discharge lamp, e.g., functions of a ballast as described in U.S. Pat. Nos. 6,586,891 and 6,975,077.

Figure 2:
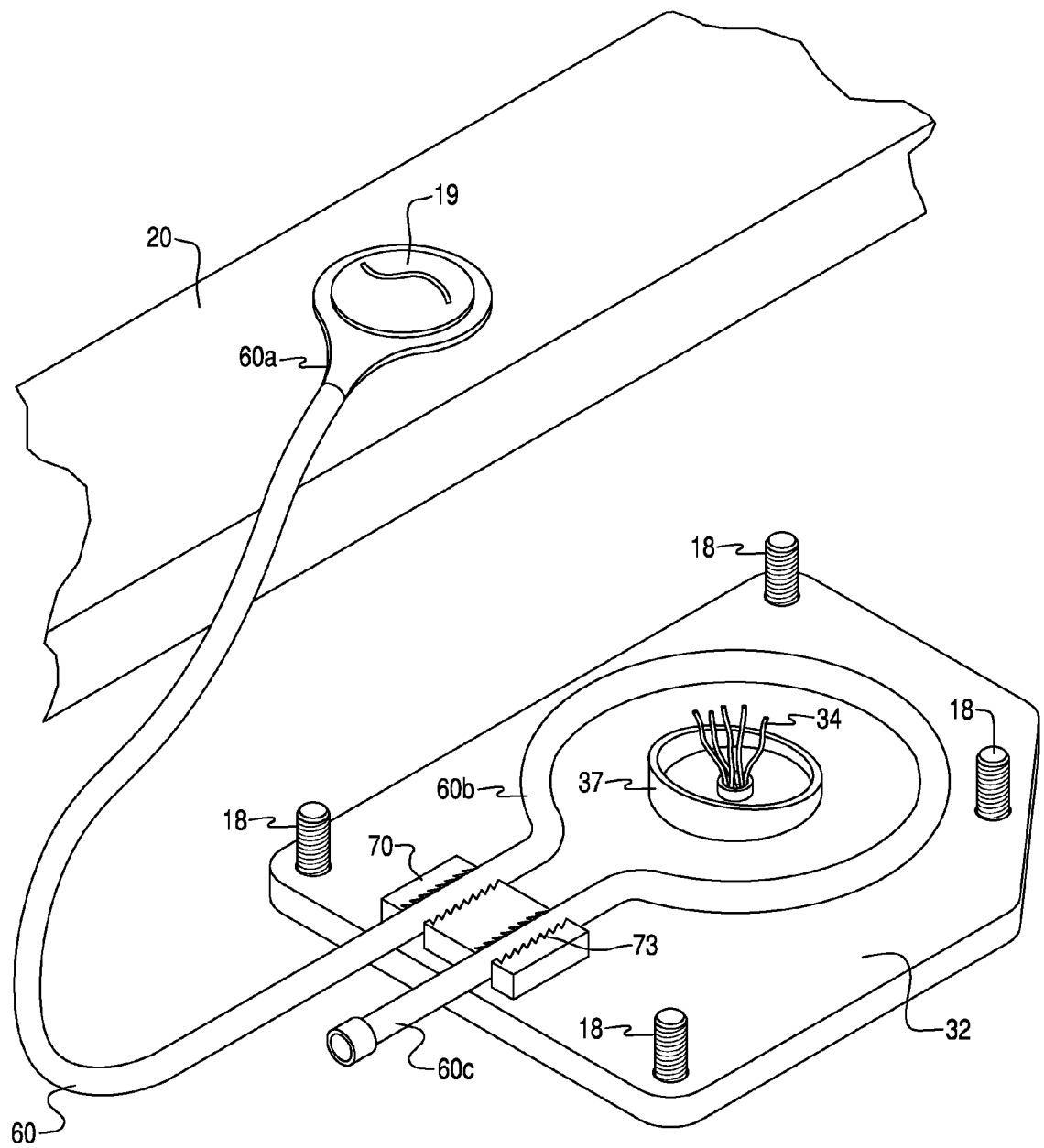
FIG. 2 is a perspective view of the embodiment shown in FIG. 1.

The ballast 32 can be mounted to the headlight housing 30 with bolts 18 extending through the ballast 32 and into the bosses 30a, 30b, and 30c formed on the headlight housing. As shown in FIGS. 1 and 2, wiring 34 can be provided to interconnect the electronic circuitry of ballast 32 with the one or more bulbs, light sources, or lamps mounted within the lamp housing 30. The lamp housing 30 can be situated behind headlight lens cover 92. A water seal 37 can separate the ballast 32 and housing 30 to ensure water does not enter either the ballast 32 or the lamp housing 30 via the openings for the electrical wires 34.

An underground market exists for used lamps and lamp components, and especially for HID headlights including their associated electronic circuitry comprising a ballast, as a result of the expense of these components. The value of these components is significantly reduced, however, if the lamps can not be taken from the vehicle with the associated ballast and interconnecting electrical wiring still intact. An exemplary theft deterrent system in accordance with an embodiment described herein can therefore include a flexible member such as a cable 60 that can be positioned around the electrical wiring 34 interconnecting the lamp(s) and the lamp device(s) and be connected to a structural member of the vehicle. The flexible member can have sufficient flexibility and length to encircle the electrical wiring and connect to the structural member of the vehicle. The flexible member can also be characterized by a breaking strength that is greater than the breaking strength of the electrical wiring interconnecting lamp device(s) and the lamp(s). The flexible member can also be configured such that when it is in position around the electrical wiring and connected to a vehicle structural member, neither the separate lamp device(s) nor the lamp(s) can be removed from the vehicle without breaking the interconnecting electrical wires 34 between the lamp(s) and the separate lamp device(s), thereby greatly reducing the value of the headlight assembly and reducing the benefit in stealing the components.

As shown in FIG. 2, one embodiment of the antitheft system can include a flexible cable 60, including a connecting portion 60a at a first end of the cable and a loop 60b at another portion of the cable. The loop 60b can be formed by bringing a second end 60c of the cable 60 around the electrical wiring 34 and securing the second end 60c to an intermediate portion of the cable using a fitting such as sleeve fitting 70. The loop 60b can be formed with cable 60 extending between electrical wiring 34 and bolts 18 which fasten a ballast 32 to bosses 30a-30c of the headlight housing 30. The sleeve fitting 70 can provide for adjustment of the opening through the loop 60b around the electrical wiring 34 until the loop will not allow passage of the ballast 32 through the loop 60b. The sleeve fitting 70 can then be crimped, locked, or otherwise fixed to cable 60 to set the size of the opening through the loop. As shown in FIG. 2, the sleeve fitting 70 can include ratchet teeth 73 that allow the cable 60 to move in a first direction relative to the fitting 70 while restraining movement in an opposite direction. The first end of the cable 60 with connecting portion 60a can be fixed to a vehicle structural member such as a frame member or bulkhead 20 using a bolt, a rivet, or other means of permanently or semi-permanently fixing the cable to the vehicle in order to deter theft of the ballast 32 and/or headlight lamp that are interconnected by electrical wiring 34.

The means by which the cable 60 is connected to the vehicle and the means by which the loop is fixed at a certain size after installation can include a variety of alternative mechanisms for allowing authorized personnel to remove the cable or adjust the size of the loop if desired. Various embodiments can include locking mechanisms for the connection between the cable and the vehicle structural member, and for adjustment of the size of the loop. Alternative embodiments can include connections that require special tools available only to authorized personnel for removal of the cable, or for loosening of the loop in order to allow removal of the separate lamp device and the connected lamp components without breaking the interconnecting electrical wiring. Further alternative embodiments can include permanent or semi-permanent means for connecting that can include, but are not limited to, welding, brazing, soldering, etc.

Figure 5A:
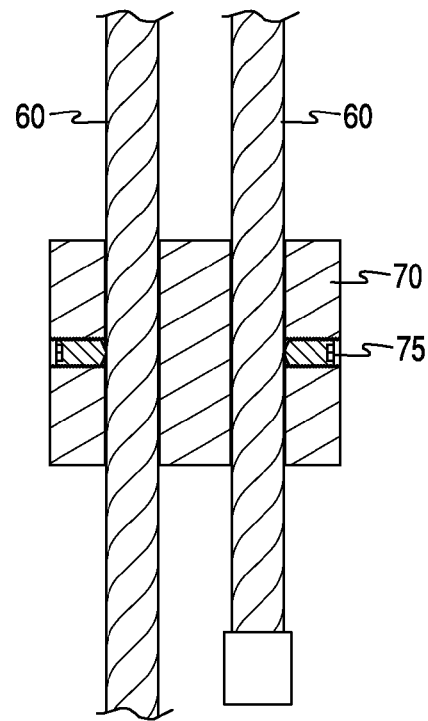
FIGS. 5a and 5b are top views of embodiments of a sleeve fitting.
Figure 5B:
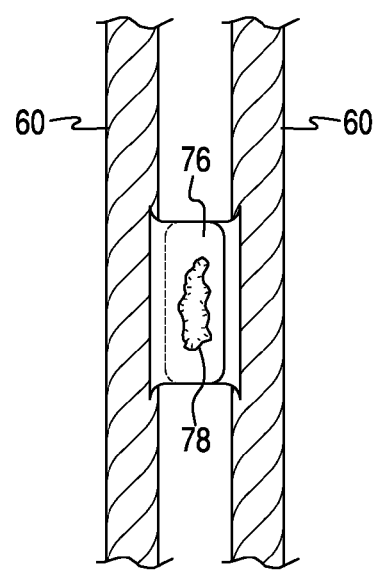

FIGS. 5a and 5b depict exemplary alternative embodiments of the sleeve fitting 70. For example, FIG. 5a shows a fitting 70 that includes lock screws 75 that can lock the cable 60 within the sleeve fitting 70. The lock screws 75 can include a unique head configuration to prevent unauthorized removal. FIG. 5b shows cables 60 provided with a connector formed as a connection portion 76 that provides an area for applying a weld 78 or other connection means to the portions of the cable 60.

According to one embodiment, and as illustrated in at least FIGS. 1 and 2, a method of deterring theft of the components or the entirety of a vehicle lamp can include providing a flexible cable 60 having a breaking strength that is greater than the breaking strength of the electrical wiring 34 interconnecting the lamp and the ballast 32. The ballast 32 can be provided as a separate board that is mounted to the headlight housing 30 using a plurality of bolts 18 arranged in a pattern around the perimeter of the ballast board. The electrical wiring 34 interconnects the ballast 32 and the vehicle lamp. The cable 60 can be provided already installed on the headlight assembly 31 before the headlight assembly 31 is installed into the vehicle or, alternatively, the cable can be completely installed after the headlight assembly is mounted in the vehicle.

An antitheft method can include connecting a first end 60a of the flexible cable 60 to a vehicle structural member 20 in a manner that will sufficiently deter removal such as to discourage or prevent disconnection of the cable 60 from the vehicle structural member 20. This connection can be achieved using one or more of a variety of antitheft materials and/or devices including, but not limited to, a high strength bolt 19, rivet, weld, locking mechanism, special fastener requiring non-standard tools for removal, etc. The cable itself can be provided from one or more materials including, but not limited to, high strength metal alloy, braided metal, high strength plastic, chain, composite materials, high strength woven materials, etc.

The second end 60c of the cable 60 opposite from the first end 60a that is to be connected to the vehicle structural member 20 can be looped around the electrical wiring 34 interconnecting the ballast 32 and the lamp housing 30, before, during, or after installation of the vehicle lamp assembly 31 into the vehicle. A fitting 70 can be provided on an intermediate portion of the cable such that the second end 60c of the cable 60 can be passed through the fitting 70 after being passed around the electrical wiring 34 to form a loop 60b. The fitting 70 can be crimped, provided with ratchet teeth 73, provided with a locking device, or otherwise fixed relative to two portions of the cable 60 after the loop 60b of cable has been tightened to a desired tightness around the electrical wiring 34 sufficient to prevent removal of at least one of the ballast 32 and/or the lamp housing 30 without breaking of the electrical wiring 34. The cable 60 can be passed between the plurality of bolts 18 connecting the ballast 32 to the lamp housing 30 and the electrical wiring 34 interconnecting the ballast 32 and the lamp housing 30.

The connection between the first end of the cable and the vehicle structural member can be made before, during, or after installation of the vehicle lamp assembly 31 into the vehicle. In an aftermarket application, a cable could be installed on an existing vehicle by running one end of the cable around the electrical wiring extending between the ballast 32 and the lamp housing 30, crimping or otherwise permanently or semi-permanently fastening the end of the cable to an intermediate portion of the cable to form a loop around the wiring, and then fastening the opposite end of the cable to a vehicle structural member. Various means can be used for connecting the cable to the vehicle structural member and for forming the loop in the cable around the wiring. Non-standard fasteners can be used that require special tools for installation and removal as one possible alternative that provides a deterrent to removal of the cable and the components of the vehicle lamp. Alternatively, the connections can be made in a permanent or semi-permanent manner such as by welding, brazing, etc.

In operation, the antitheft device described above can perform the function of either destroying or reducing the value of a vehicle lamp component when it is improperly removed from a vehicle. In addition, the antitheft device can perform the function of extending the time in which the vehicle lamp components can be removed by an unauthorized person, thus reducing the likelihood that the vehicle lamp would be targeted for theft.

While the above described embodiments are directed to a vehicle headlight, it should be noted that other types of lighting devices and other types of vehicle lights are contemplated for use with the antitheft device described above. For example, an antitheft device can be used to better secure and prevent theft of fog lights, indicator lights, and other lighting devices on a vehicle. The light source can be an incandescent lamp, an HID lamp, a cold cathode lamp, an LED lamp, etc. In addition, the antitheft device can be used to encircle electrical wires that connect between lamp devices other than ballast 32. Specifically, the antitheft device can include a cord that can encircle electrical wires that extend between a lamp housing and separate computer control structures, power transformers/regulators, ballasts, voltage regulator circuits, current regulator circuits, or other separate lamp devices.

Although a flexible member is depicted as the structure that encircles the electrical wire(s) extending between the lamp housing and the ballast 32, it is contemplated that a structural ratchet or key lock linkage such as a handcuff type device could be used to effect the encircling of the electrical wire(s). In addition, it should be understood that the loop portion of the flexible member can be configured as a full circle, a partial circle (e.g., U-shaped portion of the flexible member), or other configuration that would allow the flexible member to ensnare the electrical wiring while not permitting the flexible member to be removed from over the light source or the separate lamp device. The loop portion can also extend from a first end to a second end of the flexible member. For example, the loop entry portion can be secured to a first vehicle portion and the loop exit portion can be secured to a second vehicle portion. The loop portion of the flexible member could then extend around the electrical wires such that all of the electrical wires would be broken if the lamp is removed without unsecuring the flexible member from the vehicle. Alternatively, the loop portion could extend in a substantially straight line through the electrical wires, such that only a portion of the electrical wires would be broken if the lamp is removed without unsecuring the flexible member from the vehicle.

While the subject matter has been described in detail with reference to exemplary embodiments thereof, it will be apparent to one skilled in the art that various changes can be made, and equivalents employed, without departing from the scope of the invention.

What is claimed is:

1. A system for deterring theft of a lamp or component thereof from a vehicle, the system comprising:
   at least one light source located within a vehicle lamp housing;
   a separate lamp device;
   electrical wiring interconnecting the at least one light source and the separate lamp device; and
   a flexible member configured at one portion of the flexible member to connect to a component of the vehicle, and configured at another portion of the flexible member as a loop, the loop configured to encircle the electrical wiring interconnecting the at least one light source and the separate lamp device without allowing passage of at least one of the at least one light source and the separate lamp device through the loop.

2. The system of claim 1, further comprising:
   a fastener, wherein the loop is formed by adjustably connecting a first portion of the flexible member to a second portion of the flexible member, and the fastener is configured to fix the first portion to the second portion after the loop is formed.

3. The system of claim 1, wherein the flexible member comprises a cable of hardened metal material.

4. The system of claim 1, wherein the electrical wiring that interconnects the at least one light source and the separate lamp device has a first breaking strength, and the flexible member has a second breaking strength greater than the first breaking strength.

5. The system of claim 1, wherein the at least one light source includes a high intensity discharge lamp, and the separate lamp device includes a ballast.

6. The system of claim 1, wherein the one portion of the flexible member configured to connect to the vehicle component is at a first end of the flexible member, and the loop is at an opposite end of the flexible member.

7. The system of claim 1, wherein
   the at least one light source located in the vehicle lamp housing is mounted to a portion of the vehicle; and
   the separate lamp device is one of a ballast, power transformer, and power regulator, and is mounted to the lamp housing.

8. The system of claim 1, further comprising:
   a sleeve fitting, the sleeve fitting positioned at an intermediate portion of the flexible member and configured to allow movement of a first portion of the flexible member relative to a second portion of the flexible member when the sleeve fitting is in a first state, and configured to prevent movement of the first portion of the flexible member relative to the second portion of the flexible member when the sleeve fitting is in a second state.

9. The system of claim 1, further comprising:
   a sleeve fitting located on the flexible member, the sleeve fitting including a ratchet lock mechanism that allows a ratchet portion of the flexible member to move in one direction relative to the sleeve fitting and restrains the ratchet portion of the flexible member from movement in a second opposite direction relative to the sleeve fitting.

10. The system of claim 1, wherein the sleeve fitting includes a locking mechanism.

11. A method for deterring theft of a vehicle lamp or component thereof from a vehicle, wherein the vehicle includes a structural member and wherein the vehicle lamp includes at least one light source, a separate lamp device, and electrical wiring interconnecting the at least one light source and the separate lamp device, the method comprising:
   providing a length of a flexible member, the flexible member having a breaking strength greater than a breaking strength of the electrical wiring;

connecting a first portion of the flexible member to the vehicle structural member;

providing a connector on a second portion of the flexible member;

looping the flexible member around the electrical wiring such that the flexible member forms a loop portion, the loop portion of the flexible member being located between a loop entry portion of the flexible member and a loop exit portion of the flexible member; and adjusting the connector to lock the loop entry portion of the flexible member relative to the loop exit portion of the flexible member.

12. The method of claim 11, wherein the adjusting includes at least one of welding, soldering, and adhering the connector to another portion of the flexible member.

13. The method of claim 11, wherein the connector includes a fitting, and the adjusting includes crimping the fitting to lock the loop entry portion relative to the loop exit portion.

14. The method of claim 11, further comprising:
connecting the first portion of the flexible member to the vehicle structural member using at least one of a bolt, rivet, screw, and clamp, that includes a non-standard head requiring a special tool for removal.

15. The method of claim 11, further comprising:
connecting the first portion of the flexible member to the vehicle structural member by use of at least one of welding, brazing, soldering and adhesives.

16. The method of claim 11, wherein the flexible member is looped around the electrical wiring and adjusted to lock before the vehicle lamp is installed in the vehicle.

17. An antitheft apparatus for deterring theft of a vehicle lamp or component thereof, wherein the vehicle includes a structural member and wherein the vehicle lamp includes at least one light source, separate lamp device, and electrical wiring interconnecting the at least one light source and the separate lamp device, the antitheft apparatus comprising:

a flexible member, the flexible member having a breaking strength greater than a breaking strength of the electrical wiring;

means for connecting a first portion of the flexible member to the vehicle structural member;

means for fixing a loop in the flexible member around the electrical wiring such that the at least one light source and the separate lamp device cannot pass through the loop.

18. The antitheft apparatus of claim 17, wherein the vehicle lamp is a high intensity discharge headlight, and the separate lamp device is a ballast.

19. The antitheft apparatus of claim 17, wherein the means for fixing a loop includes a fitting that includes a crimpable structure.

20. The antitheft apparatus of claim 17, wherein the means for connecting the first portion of the flexible member to the vehicle structural member includes a non-standard bolt.

* * * * *